United States Patent
Chickering

(10) Patent No.: US 9,350,704 B2
(45) Date of Patent: *May 24, 2016

(54) PROVISIONING NETWORK ACCESS THROUGH A FIREWALL

(71) Applicant: Juniper Networks, Inc., Sunnyvale, CA (US)

(72) Inventor: Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,912

(22) Filed: Aug. 8, 2014

(65) Prior Publication Data

US 2014/0351917 A1 Nov. 27, 2014

Related U.S. Application Data

(63) Continuation of application No. 12/013,126, filed on Jan. 11, 2008, now Pat. No. 8,806,605.

(51) Int. Cl.
*H04L 29/06* (2006.01)

(52) U.S. Cl.
CPC ............ *H04L 63/02* (2013.01); *H04L 63/0227* (2013.01); *H04L 63/08* (2013.01); *H04L 63/10* (2013.01)

(58) Field of Classification Search
CPC ..... H04L 63/02; H04L 63/08; H04L 63/0227; H04L 63/10
See application file for complete search history.

(56) References Cited

U.S. PATENT DOCUMENTS

| | | | |
|---|---|---|---|
| 6,170,012 B1 | 1/2001 | Coss et al. | |
| 6,640,242 B1 | 10/2003 | O'Neal et al. | |
| 7,047,564 B2 | 5/2006 | Cohen | |
| 7,054,944 B2 | 5/2006 | Tang et al. | |
| 7,143,438 B1 | 11/2006 | Coss et al. | |
| 7,296,291 B2 * | 11/2007 | Tahan | 726/11 |
| 7,328,451 B2 | 2/2008 | Aaron | |
| 7,711,097 B2 | 5/2010 | Ji et al. | |
| 7,822,970 B2 | 10/2010 | Burstein | |
| 7,881,291 B2 | 2/2011 | Grah | |
| 8,806,605 B1 | 8/2014 | Chickering | |
| 2003/0069973 A1 * | 4/2003 | Ganesan et al. | 709/226 |
| 2004/0266420 A1 * | 12/2004 | Malinen et al. | 455/421 |
| 2005/0283536 A1 | 12/2005 | Swanson et al. | |
| 2008/0098476 A1 * | 4/2008 | Syversen | 726/23 |
| 2009/0147795 A1 | 6/2009 | Mevissen et al. | |
| 2010/0037311 A1 | 2/2010 | He et al. | |

* cited by examiner

*Primary Examiner* — Mohammad A Siddiqi
(74) *Attorney, Agent, or Firm* — Harrity & Harrity, LLP

(57) ABSTRACT

A method may include determining one or more rules and communicating the one or more rules to a firewall, where the firewall receives a data unit and determines, based on the one or more rules, whether to forward the data unit to a destination address; receiving a redirection of a device from the firewall when the firewall determines not to forward the data unit to the destination address; receiving an indication that the firewall did not forward the data unit to the destination address; and determining a new rule to allow the firewall to forward the data unit to the destination address and communicating the new rule to the firewall; and redirecting the device to the destination address.

20 Claims, 9 Drawing Sheets

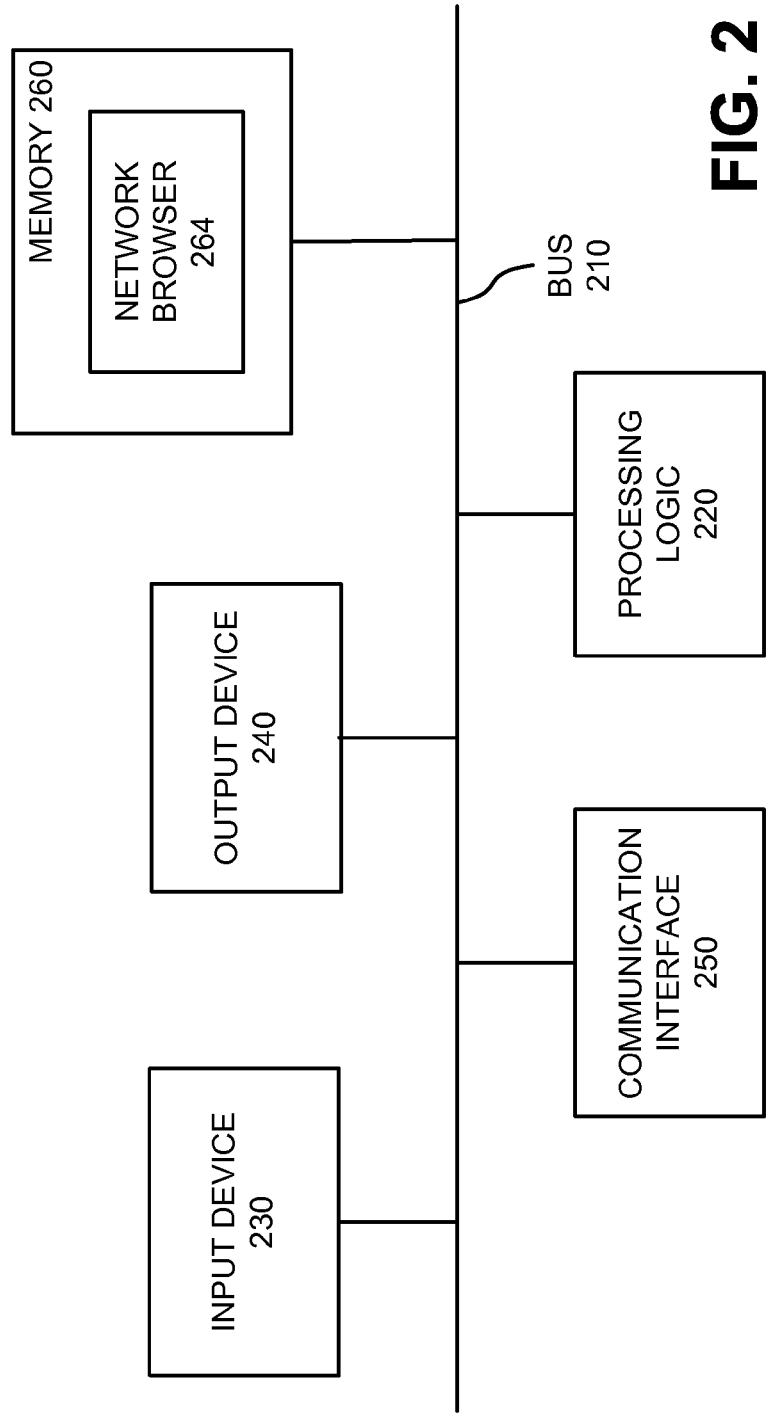

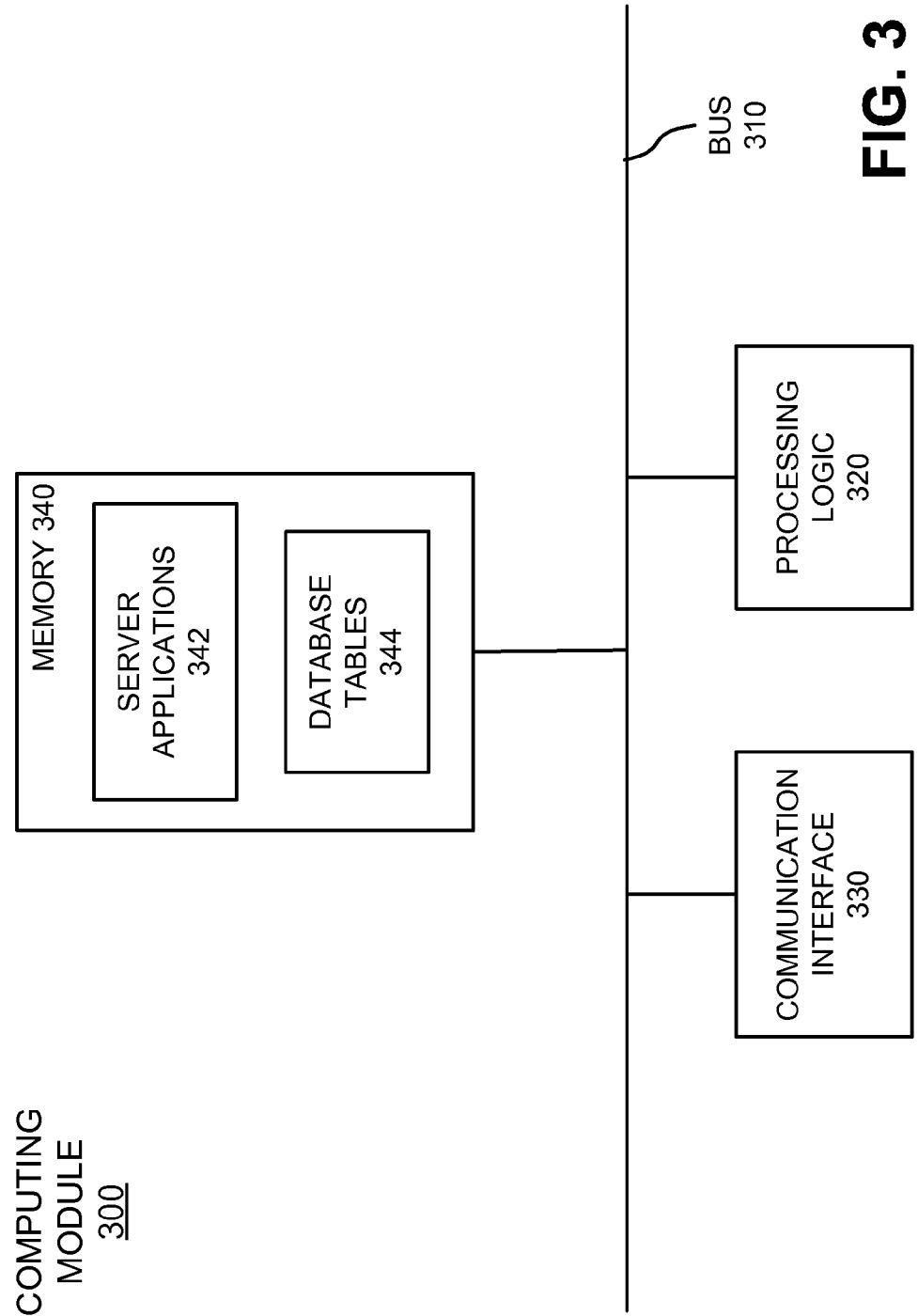

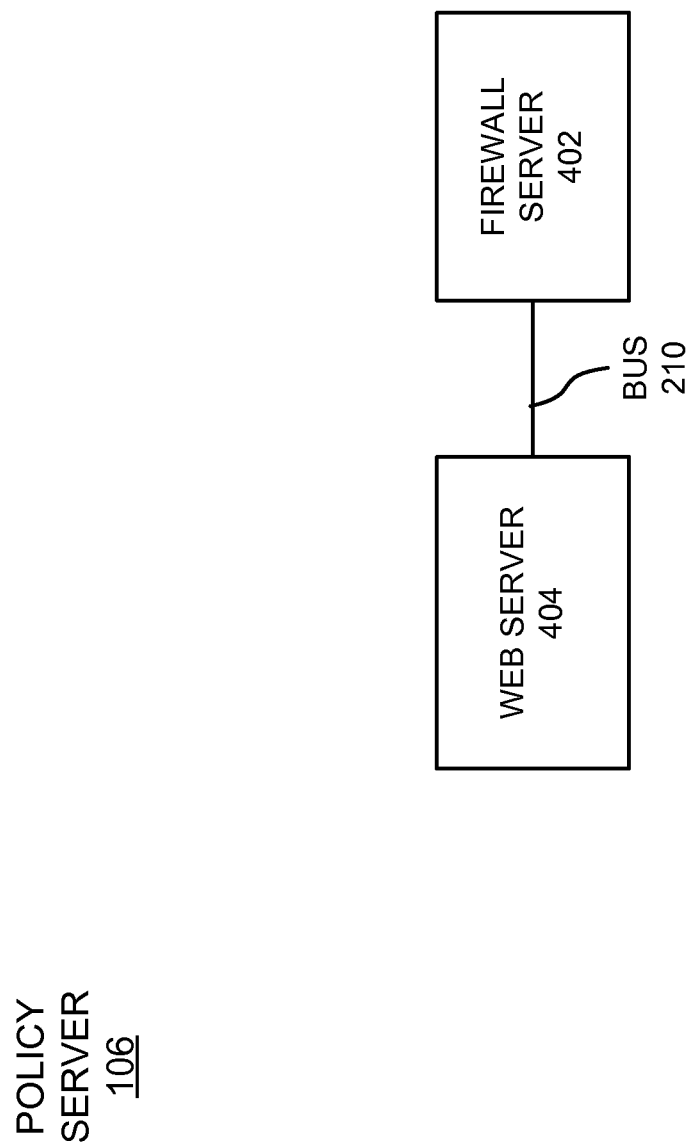

FIG. 5A

RULE TABLE 500

| DESTINATION ADDRESS 502 | SOURCE ADDRESS 504 | DESTINATION PORT 506 | SOURCE PORT 508 |
|---|---|---|---|
| 1.2.3.4 | 1.2.3.5 | 80 | 2222 |

RULE TABLE 500'

| DESTINATION ADDRESS 502 | SOURCE ADDRESS 504 | DESTINATION PORT 506 | SOURCE PORT 508 |
|---|---|---|---|
| 1.2.3.4 | 1.2.3.5 | 80 | 2222 |
| 1.2.3.6 | 1.2.3.7 | 80 | 2323 |

RULE TABLE 600

| DESTINATION ADDRESS 602 | SOURCE ADDRESS 604 | DESTINATION PORT 606 | SOURCE PORT 608 | ACKNOWLEDGMENT 610 |
|---|---|---|---|---|
| 1.2.3.4 | 1.2.3.5 | 22 | 2222 | Y |
| ... | | | | |

RULE TABLE 600'

| DESTINATION ADDRESS 602 | SOURCE ADDRESS 604 | DESTINATION PORT 606 | SOURCE PORT 608 | ACKNOWLEDGMENT 610 |
|---|---|---|---|---|
| 1.2.3.4 | 1.2.3.5 | 22 | 2222 | Y |
| 1.2.3.6 | 1.2.3.7 | 23 | 2323 | N |
| ... | | | | |

RULE TABLE 600"

| DESTINATION ADDRESS 602 | SOURCE ADDRESS 604 | DESTINATION PORT 606 | SOURCE PORT 608 | ACKNOWLEDGMENT 610 |
|---|---|---|---|---|
| 1.2.3.4 | 1.2.3.5 | 22 | 2222 | Y |
| 1.2.3.6 | 1.2.3.7 | 23 | 2323 | Y |
| ... | | | | |

620"
622"

| PRIVILEGE TABLE 700 | |
|---|---|
| NETWORK ADDRESS 702 | PERMISSION 704 |
| 1.2.3.4 | ADDRESS: 1.2.3.5, DESTINATION PORT: 22, SOURCE PORT: 2222 |
| 1.2.3.6 | ADDRESS: 1.2.3.7, DESTINATION PORT: 23, SOURCE PORT: 2323 |
| ... | |

720 — (row 1)
722 — (row 2)

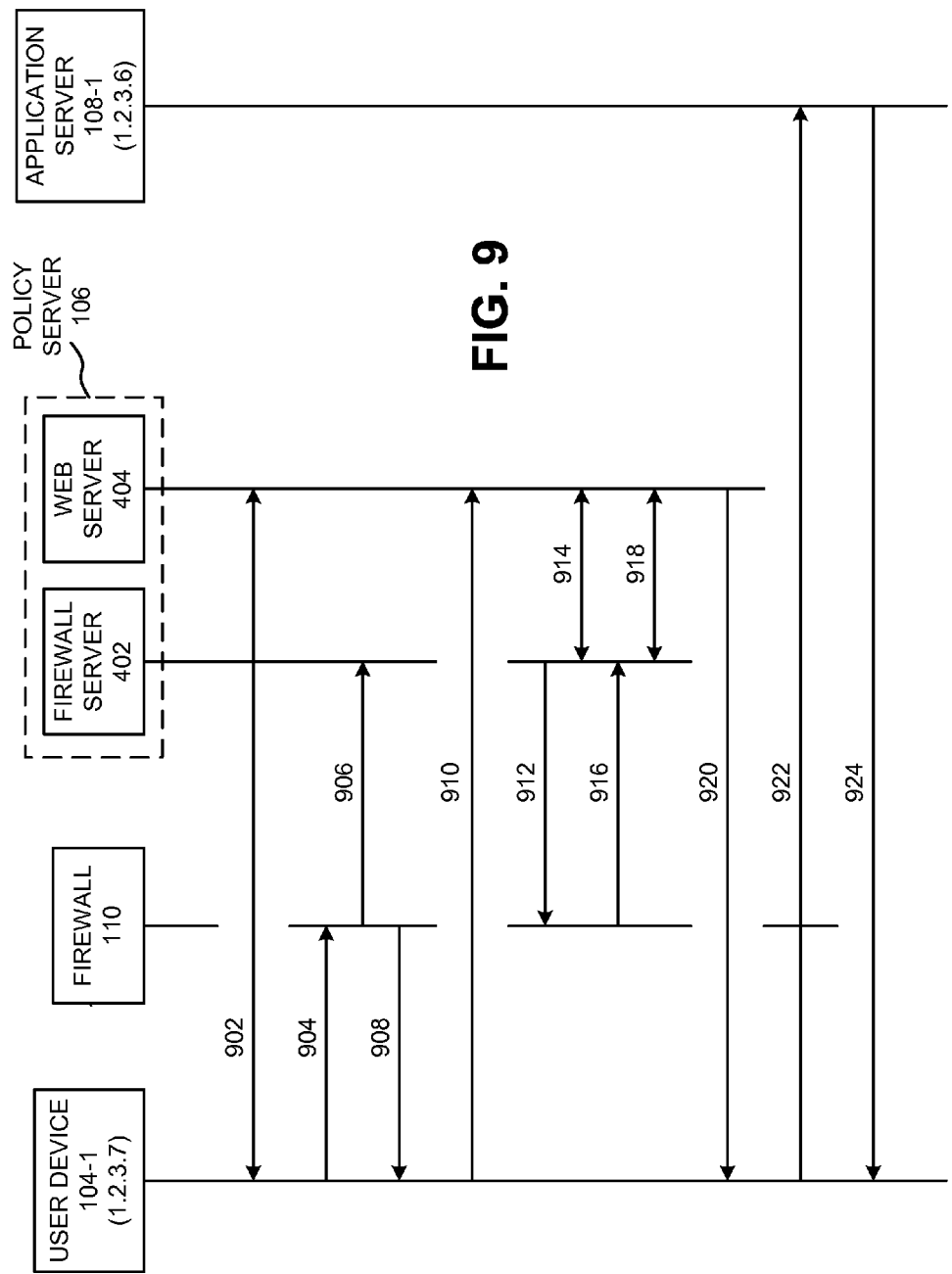

PROVISIONING NETWORK ACCESS THROUGH A FIREWALL

RELATED APPLICATION

This application is a continuation of U.S. patent application Ser. No. 12/013,126, filed Jan. 11, 2008 (now U.S. Pat. No. 8,806,605), which is incorporated herein by reference.

BACKGROUND

More and more organizations are implementing networks in which users authenticate to a server on the network before acquiring access to network services. Once users have access to network services, users may use that access to use network-based applications such as intranets, web-based email, web-based word processors, database services, document management services, content management services, etc.

SUMMARY

A method may include determining one or more rules and communicating the one or more rules to a firewall, where the firewall receives a data unit and determines, based on the one or more rules, whether to forward the data unit to a destination address; receiving a redirection of a device from the firewall when the firewall determines not to forward the data unit to the destination address; receiving an indication that the firewall did not forward the data unit to the destination address; and determining a new rule to allow the firewall to forward the data unit to the destination address and communicating the new rule to the firewall; and redirecting the device to the destination address.

A network device may include processing logic to determine one or more rules and communicate the one or more rules to a firewall, where the firewall receives a data unit from a first device and determines, based on the one or more rules, whether to forward the data unit to a destination address; processing logic to receive a redirection of the first device from the firewall when the firewall determines not to forward the data unit to the destination address; processing logic to receive an indication that the firewall did not forward the data unit to the destination address; processing logic to determine a new rule to allow the firewall to forward the data unit to the destination address and communicate the new rule to the firewall; and processing logic to redirect the first device to the destination address after the new rule has been communicated to the firewall.

An apparatus may include means for determining one or more rules and communicating the one or more rules to a firewall, where the firewall receives a data unit and determines, based on the one or more rules, whether to forward the data unit to a destination address; means for receiving a redirection of a device from the firewall when the firewall determines not to forward the data unit to the destination address; means for receiving an indication that the firewall did not forward the data unit to the destination address; and means for determining a new rule to allow the firewall to forward the data unit to the destination address and communicating the new rule to the firewall; and means for redirecting the device to the destination address. In one embodiment, the means for redirecting the device to the destination address includes means for redirecting the device to the destination address after the new rule has been communicated to the firewall.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 2 is a block diagram of exemplary components of a user device of FIG. 1;

FIG. 3 is a block diagram of exemplary components of a server computing module;

FIG. 4 is a block diagram of exemplary components of the policy server of FIG. 1;

FIGS. 5A and 5B are block diagrams of an exemplary rule table representing different time periods;

FIGS. 6A, 6B, and 6C are block diagrams of an exemplary firewall table;

FIG. 7 is a block diagram of an exemplary privilege table;

FIG. 9 is a signal diagram of exemplary signals that may be sent between an application server, a user device, a policy server, and a firewall.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Employees may access servers over a network, such as a local-area network (LAN) or the Internet, for example, to request resources (e.g., services and applications) provided by those servers. For example, an employee may want to access a document management database. The employee may also want to access benefits information from the corporate human resources web page. These two services may be hosted on separate servers within a corporate network and behind a firewall. Access through the firewall for the employee may be provisioned. Embodiments disclosed herein may allow for a user (e.g., a user name or user device) to authenticate with a policy server (e.g., an identity provider) that handles authentication for a number of network servers or other resources. When the user device requests resources from an application server (e.g., a service provider), the firewall may initially redirect the user device to the policy server and request the provisioning of access through the firewall by the user device. In one embodiment, after access is provisioned, the policy server may redirect the user device back to the requested resource in the application server.

Exemplary Environment

Figure 1:
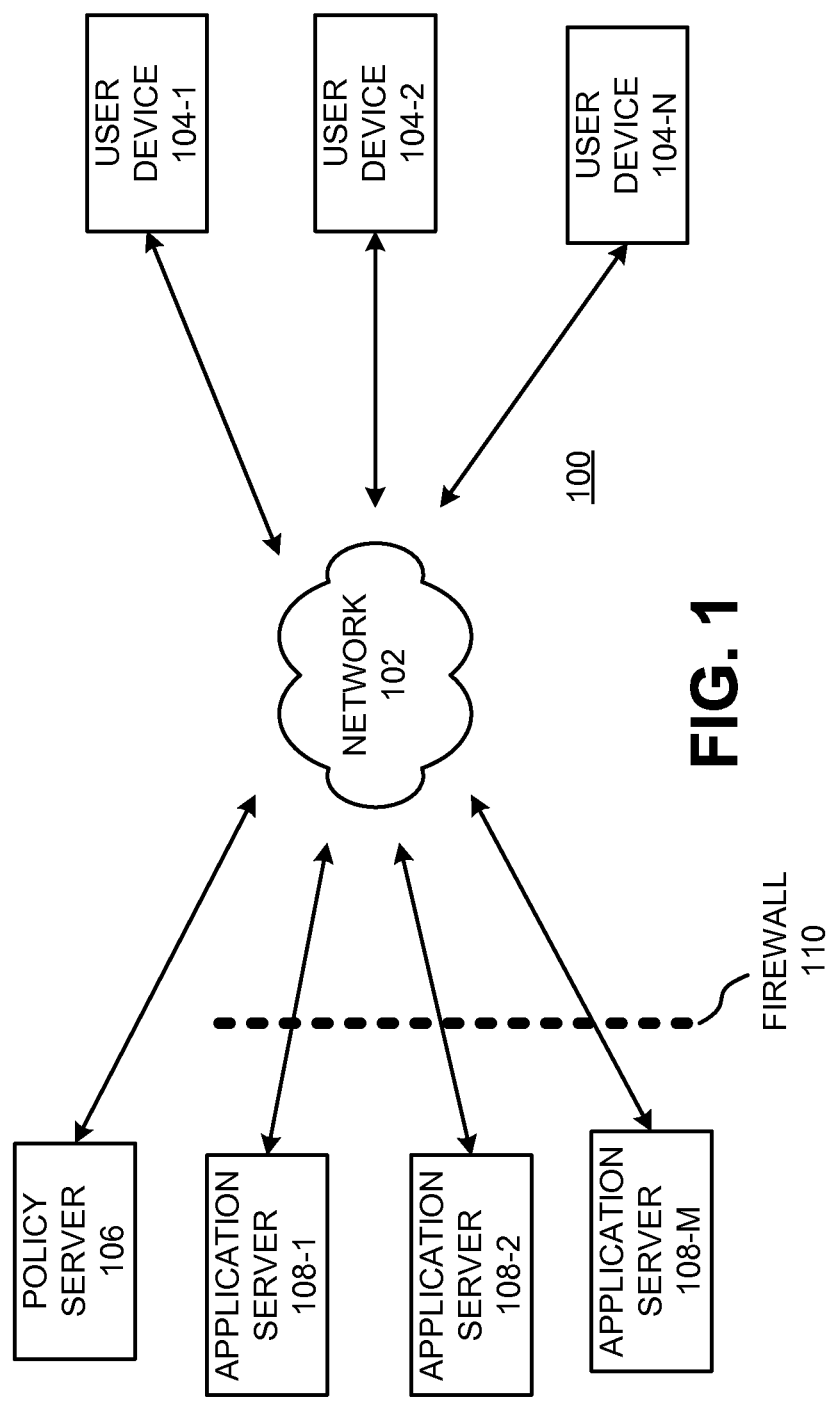
FIG. 1 is a block diagram of an exemplary environment in which systems and methods described herein may be implemented.

FIG. 1 is a block diagram of an exemplary environment 100 that may include a network 102, user devices 104-1 through 104-N(individually "user device 104-x," collectively "user devices 104"), a policy server 106, application servers 108-1 through 108-M (individually "application server 108-x," collectively "application servers 108"), and a firewall 110. In practice, there may be more, different, or fewer devices or a different arrangement of devices than what is shown in FIG. 1. For example, environment 100 may include thousands or even millions of user devices 104 (the number of which is denoted in FIG. 1 by N). Environment 100 may also include dozens of application servers 108 (the number of which is denoted in FIG. 1 by M).

Further, while FIG. 1 shows user devices 104, policy server 106, application servers 108, and firewall 110 in environment 100, one or more of these devices may be remotely located from the others, e.g., the devices may be geographically diverse. Although arrows in FIG. 1 may indicate communication between devices and network 102, communication may be direct between devices or indirect through one or more networks. User devices 104, policy server 106, application servers 108, and firewall 110 may be considered "nodes" or "devices" coupled to or located within network 102.

Communication among user devices 104, policy server 106, application servers 108, and firewall 110 may be accomplished via wired and/or wireless communication connections. Network 102 may include a wide-area network (WAN) (e.g., the Internet), a local-area network (either wired or wireless), a telephone network (e.g., the Public Switched Telephone Network (PSTN)), an intranet, a private corporate network, or a combination of networks.

User devices 104 may include computers, telephones, personal digital assistants, or any other communication devices that may transmit or receive data. User devices 104 may include, for example, computers that send and/or receive data through network 102. User devices 104 may also include, for example, telephones that send and/or receive voice conversations, video conferences, etc., through network 102.

Policy server 106 may receive requests, such as authentication, authorization, and/or access requests, from user devices 104, application servers 108, and/or firewall 110. For example, policy server 106 may receive a request from user device 104-x to be authenticated and to establish a session with policy server 106. In response, policy server 106 may provision authorization and access for user device 104-x after authenticating user device 104-x and may establish a channel for communication between user device 104-x and policy server 106. Policy server 106 may communicate with firewall 110 to provision access for user device 104-x through firewall 110.

Application servers 108 may provide application services to user devices 104 (or other nodes) in environment 100. Such services may include document management services, email services, calendar services, instant messaging services, etc.

Although application servers 108 are shown in FIG. 1 as separate devices, in one embodiment, one or more application servers 108 may be configured as virtual machines running in one or more computers. In addition, although policy server 106 is shown separate from application servers 108, in one embodiment, policy server 106 may also be configured as a virtual machine running in a computer that may also host other virtual machines, such as one or more application servers 108 implemented as virtual machines.

In one embodiment, application servers 108 and policy server 106 may be part of a common corporate environment, for example. In other words, application servers 108 may provide applications to corporate employees who may be authenticated by policy server 106.

Firewall 110 may prevent devices, e.g., user devices 104, from accessing application servers 108 without permission (e.g., authentication and authorization). To do this, packets (e.g., data units) going to and from application servers 108 may pass through firewall 110. Firewall 110 may enforce rules that define which packets may pass through firewall 110—in one or both directions. For example, firewall 110 may compare a received packet to a criterion or criteria, which may define a rule, to determine whether the packet may be forwarded to its destination, forwarded to a different destination, and/or dropped. Comparisons to criteria, for example, may include comparing a received packet's source and destination address, source and destination port number, and/or protocol type to a table of allowed source and destination addresses, source and destination port numbers, and/or protocol types. By performing this comparison, firewall 110 may help protect application servers 108 from malicious traffic or from unauthorized and/or unauthenticated user devices 104. Besides forwarding or dropping packets, firewall 110 may perform other functions on packets, such as monitoring packets to police user bandwidth, etc. Although device 110 is referred to as a "firewall," it may perform any other networking functions, such as that of a switch, router, etc.

Exemplary User Device

FIG. 2 is a block diagram of exemplary components of user device 104-x. As illustrated, device 104-x may include a bus 210, processing logic 220, an input device 230, an output device 240, a communication interface 250, and a memory 260. Device 104-x may include other components (not shown) that aid in receiving, transmitting, and/or processing data. Moreover, other configurations of components in device 104-x are possible. Further, one or more components of device 104-x may be remotely located from the other components.

Bus 210 may include a path that permits communication among the components of device 104-x. Processing logic 220 may include any type of processor or microprocessor (or groups of processors or microprocessors) that interprets and executes instructions. For example, processing logic 220 may include an application-specific integrated circuit (ASIC), a field-programmable gate array (FPGA), or the like.

Input device 230 may include a device that permits a user to input information into device 104-x, such as a keyboard, a keypad, a mouse, a pen, a microphone, a remote control, a touch-screen display, one or more biometric mechanisms, or the like. Input device 230 may be used, for example, for receiving passwords (or biometric data) for authenticating a user of user device 104-x.

Output device 240 may include a device that outputs information to the user, such as a display, a printer, a speaker, etc. Output device 240 may include a vibrator to alert a user. Input device 230 and output device 240 may allow the user of device 104-x to receive a menu of options. The menu may allow the user to select various functions or services associated with applications executed by device 104-x or other devices coupled to network 102. Input device 230 and output device 240 may allow the user to activate a particular service or application, such as a service or application provided by one of application servers 108-1 or policy server 106.

Communication interface 250 may include any transceiver-like mechanism that enables device 104-x to communicate with other devices and/or systems. Communication interface 250 may include a transmitter that may convert baseband signals from processing logic 220 to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna (not shown) for transmission and reception of the RF signals. Communication interface 250 may include a network interface card, e.g., Ethernet card, for wired communications or a wireless network interface (e.g., WiFi) card for wireless communications.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing logic 220; and/or some other type of magnetic or optical recording medium and its corresponding drive, e.g., a hard disk drive (HDD), for storing information and/or instructions.

In accordance with embodiments described herein, memory 260 may include a network browser application 264 ("browser 264"). Browser 264 may include a web browser, such as the Mozilla Firefox browser, Epiphany browser, Opera browser, Konquerer browser, Safari browser, Internet Explorer browser, etc. Browser 264 may be any application that may request a universal resource indicator (URI) or a universal resource locator (URL). Other examples of browsers may include a soft phone (e.g., X-Lite or Ekiga), an e-mail reader or client (e.g., Thunderbird or Outlook), or other programs (e.g., Google Earth).

Device 104-*x* may perform certain operations, as described in detail below. Device 104-*x* may perform these operations in response to processing logic 220 executing software instructions contained in a computer-readable medium, such as memory 260. A computer-readable medium may be defined as a physical or logical memory device. The software instructions may be read into memory 260 from another computer-readable medium or from another device via communication interface 250. The software instructions contained in memory 260 may cause processing logic 220 to perform processes that are described below.

Exemplary Server Computing Module

FIG. 3 is a block diagram of exemplary components of a server computing module 300 ("module 300"). Policy server 106, application servers 108, and/or firewall 110 may each include one or more computing modules 300. That is, policy server 106, application servers 108, and/or firewall 110 may each include a rack of one or more computing modules, such as computing module 300. Module 300 may include a bus 310, processing logic 320, a communication interface 330, and a memory 340. Module 300 may include other components (not shown) that aid in receiving, transmitting, and/or processing data. Moreover, other configurations of components in module 300 are possible. In addition, policy server 106 and application servers 108 may include other components (not shown) or configurations of components.

Bus 310 may include a path that permits communication among the components of module 300. Processing logic 320 may include any type of processor or microprocessor that interprets and executes instructions. In other embodiments, processing logic 320 may include an ASIC, FPGA, or the like.

Communication interface 330 may include any transceiver-like mechanism (e.g., a receiver/transmitter combination) that enables module 300 to communicate with other devices and/or systems. Communication interface 330 may allow for wired or wireless communications. In one embodiment, communication interface 330 may allow for module 300 to be controlled and/or administered remotely by an operator or an administrator.

Memory 340 may include a RAM or another type of dynamic storage device that may store information and instructions for execution by processing logic 320; a ROM device or another type of static storage device that may store static information and instructions for use by processing logic 320; and/or some other type of magnetic or optical recording medium and its corresponding drive for storing information and/or instructions. According to embodiments described herein, memory 340 may store one ore more server applications 342 ("server application 342") and database tables 344. In the case of policy server 106, for example, server application 342 may include an authorization, authentication, and/or access application for providing identity services to a network (e.g., network 102). In the case of application servers 108, server application 342 may include applications such as a web-based document management system, a content management system, a human resources application, etc. Server application 342 may include any other type of application. Server application 342 may include instructions for causing module 300 to implement and provide services and processes described herein. Database tables 344 may include data stored and used by server application 342, for example, for providing the network services described herein.

Computing module 300 may perform certain operations, as described in detail below. Computing module 300 may perform these operations in response to processing logic 320 executing software instructions contained in a computer-readable medium, such as memory 340. The software instructions may be read into memory 340 from another computer-readable medium or from another device via communication interface 330. The software instructions contained in memory 340 may cause processing logic 320 to perform processes that are described below.

Exemplary Policy Server

FIG. 4 is an exemplary functional block diagram of policy server 106. Policy server 106 may include a firewall server 402, a web server 404, and bus 210. Policy server 106 may include other functional blocks not shown in FIG. 4. In one embodiment, each of web server 404 and firewall server 402 may be hosted on one or more separate computing modules, such as computing module 300. In another embodiment, firewall server 402 and web server 404 may be hosted in the same computing module, such as computing module 300. In yet another embodiment, firewall server 402 and web server 404 may be hosted in virtual machines in one or more computing modules, such as computing module 300. Although web server 404 and firewall server 402 are described as servers, each may be a program or lines of code being executed in policy server 106.

Firewall server 402 may communicate with firewall 110 to provision access for user devices 104. For example, firewall server 402 may communicate with firewall 110 so that firewall 110 may allow user device 104-1 to communicate with application server 108-1, e.g., so that firewall 110 will pass packets between user device 104-1 and application server 108-1. More specifically, firewall server 402 may send a command to firewall 110 indicating to firewall 110 that packets that meet a rule, such as a packet with the source IP address, source port, source protocol, etc., may be allowed to pass through firewall 110. Firewall server 402 may also receive communications from firewall 110 indicating the status of firewall 110, e.g., a list of current rules being enforced by firewall 110. Firewall server 404 may perform other functions. A rule may be said to open a pinhole in firewall 110 for packets that meet the rule to pass through the pinhole.

web server 404 may interact with user devices 104 until web server 404 confirms with firewall server 402 that firewall 110 has appropriately provisioned access. For example, web server 404 may interact with user device 104-1 until web server 404 confirms with firewall server 402 that firewall 110 has provisioned access for user device 104-1 for user device 104-1 to reach an application server, such as application server 108-1. Web server 404 may perform other functions.

As described above, bus 210 may include a path, either physical and/or logical, that permits communication among the components of policy server 106, such as web server 404 and firewall server 402.

Exemplary Database Tables

FIGS. 5A and 5B are block diagrams of an exemplary rule table 500 representing different time periods. Rule table 500 may store information regarding the rules established by firewall 110 for acting on packets passing through firewall 110. Rule table 500 may be stored, for example, in memory 340 as one of database tables 344 of computing module 300 in firewall 110. In addition, rule table 500 or portions of rule table 500 may be stored in other devices coupled to network 102.

Each entry, (e.g., row) in rule table 500 may correspond to a different data stream allowed to pass through firewall 110, e.g., a different pinhole or rule. Any number of rules may be found in rule table 500. As illustrated, rule table 500 may include a destination address field 502, a source address field 504, a destination port number field 506, and a source port number field 508.

Rule table 500 may include additional, different, or fewer fields than illustrated in FIG. 5. For example, rule table 500 may include a field (not shown) for protocol type. As another example, rule table 500 may exclude source address field 504, source port number field 508, and/or acknowledgment field 510. As yet another example, rule table 500 may include a field (not shown) for an action to be performed when a packet matches the rule. An action may include INSPECT if firewall 110 performs a policing function, such as monitoring a user's bandwidth.

Destination address field 502 may identify the destination network address of packets that may pass through firewall 110. Source address field 504 may identify the source network address of packets that may pass through firewall 110. Destination port number field 506 may identify the destination port number of packets that may pass through firewall 110. Source port number field 508 may identify the source port number of packets that may pass through firewall 110.

In the exemplary rule table of FIG. 5A, rule table 500 may store information related to a rule, e.g., rule 520. Rule 520, for example, indicates that a packet with a destination address of 1.2.3.4, a source address of 1.2.3.5, a destination port of 80, and a source port of 2222 may pass through firewall 110. In the exemplary rule table of FIG. 5B, rule table 500' may store an additional rule to that of rule table 500 of FIG. 5A, e.g., rule 522. Rule 522, for example, indicates that a packet with a destination address of 1.2.3.6, a source address of 1.2.3.7, a destination port of 80, and a source port of 2323 may pass through firewall 110.

FIGS. 6A, 6B, and 6C are block diagrams of an exemplary rule table 600, each representing different time periods. Like rule table 500, rule table 600 may store information regarding the rules established by firewall 110 for acting on packets passing through firewall 110. Rule table 600, however, may be stored in policy server 106 so that policy server 106 may keep track of the rules in firewall 110 and the rules that policy server 106 has requested that firewall 110 provision. Thus, rule table 600 may be stored, for example, in memory 340 as one of database tables 344 of computing module 300 in web server 404. In addition, rule table 600 or portions of rule table 600 may be stored in other devices coupled to network 102.

Like rule table 500, each entry, e.g., row, in rule table 600 may correspond to a different data stream allowed to pass through firewall 110. Any number of rules may be found in rule table 600. As illustrated, rule table 600 may include a destination address field 602, a source address field 604, a destination port number field 606, a source port number field 608, and an acknowledgment field 610. Like rule table 500, rule table 600 may include additional, different, or fewer fields than illustrated in FIG. 6.

The fields 602 through 608 in rule table 600 may have similar functions and purposes as the fields 502 through 508 in rule table 500. Specifically, destination address field 602 may identify the destination network address of packets that may pass through firewall 110; source address field 604 may identify the source network address of packets that may pass through firewall 110; destination port number field 606 may identify the destination port number of packets that may pass through firewall 110; source port number field 608 may identify the source port number of packets that may pass through firewall 110.

In one embodiment, acknowledgment field 610 is found in rule table 600, but not in rule table 500. Acknowledgment field 610 may indicate whether an acknowledgment of the corresponding rule has been received. For example, firewall server 402 may use acknowledgment field 610 to indicate that an acknowledgment of the provisioning of the corresponding rule has been received from firewall 110.

In the exemplary rule table of FIG. 6A, rule table 600 may store information related to a rule, e.g., rule 620. Rule 620 (stored in firewall server 402) may correspond to rule 520 stored in firewall 110. Rule 620, for example, indicates that a packet with a destination address of 1.2.3.4, a source address of 1.2.3.5, a destination port of 80, and a source port of 2222 may pass through firewall 110. Acknowledgment field 610 in rule 620 ("Y") may indicate that an acknowledgment of the provisioning of rule 620 has been received from firewall 110.

In the exemplary rule table of FIG. 6B, rule table 600' may store an additional rule to that of rule table 600 of FIG. 6A, e.g., rule 622. Rule 620 (stored in firewall server 402) may correspond to rule 520 stored in firewall 110. Rule 622, for example, indicates that a packet with a destination address of 1.2.3.6, a source address of 1.2.3.7, a destination port of 80, and a source port of 2323 may pass through firewall 110. Acknowledgment field 610 of rule 622 ("N") indicates that an acknowledgment of the provisioning of rule 622 has not been received from firewall 110.

In the exemplary rule table of FIG. 6C, rule table 600" may store the same two rules as rule table 600' of FIG. 6B, e.g., rules 622 and 624. In rule table 600", however, acknowledgment field 610 of rule 622 ("Y") indicates that an acknowledgment of the provisioning of rule 622 has been received from firewall 110.

FIG. 7 is a block diagram of an exemplary privilege table 700. Privilege table 700 may store values representing privileges or access levels afforded to user devices, such as user device 104-1. For example, privilege table 700 may include a record indicating that, after authentication, user device 104-1 may be authorized to access application server 108-1, which may store benefits information. In one embodiment, privilege table 700 may include a device network address field 702 and a permission field 704. Privilege table 700 may include additional, different, or fewer fields than illustrated in FIG. 7.

Network address field 702 may include the network address of an authenticated user device. Permissions field 704 may include the permissions afforded the user device having the network address in corresponding address field 702.

The exemplary privilege table 700 may include two records, e.g., entries or rows, for the user devices authenticated at network addresses 1.2.3.5 and 1.2.3.6. As shown in an exemplary record 720, user device 104-x authenticated at 1.2.3.5 may have permission (defined in permission field 704)

to access network address 1.2.3.4 (e.g., application server 108-2) using source port 2222 and destination port 80. As shown in an exemplary record 722, the user device authenticated at 1.2.3.6 (e.g., user device 104-1) may have permission (defined in permission field 704) to access network address 1.2.3.7 (e.g., application server 108-1) using source port 2323 and destination port 80.

Privilege table 700 is for exemplary purposes. Other configurations of privilege tables are possible. For example, one configuration may include a separate user table that includes a user name field and a privilege group field. A corresponding privilege group table may define permissions afforded different privilege groups.

Exemplary Processing

Figure 8:
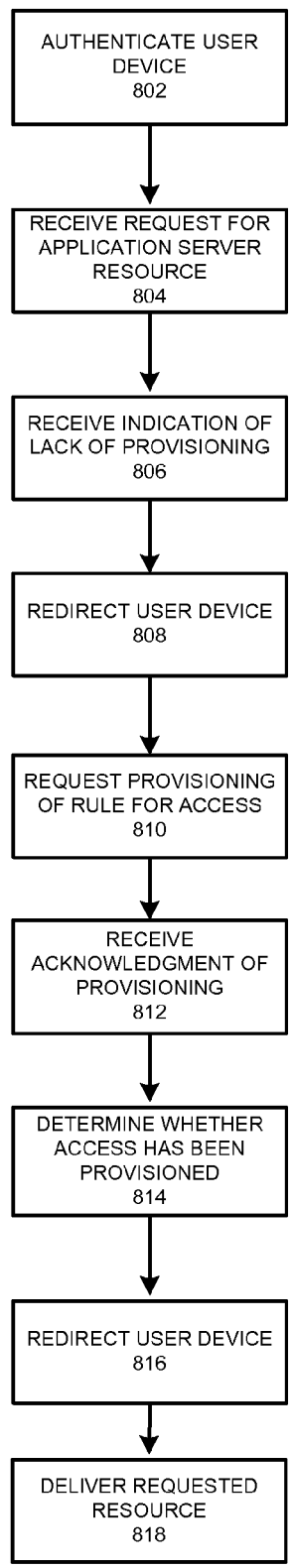
FIG. 8 is a flowchart of an exemplary process for provisioning access through a firewall.

FIG. 8 is a flowchart of an exemplary process 800 for provisioning access through firewall 110. Process 800 is described with respect to FIG. 9. FIG. 9 is a signal (e.g., message) diagram of exemplary signals that may be sent between application server 108-1, user device 104-1, policy server 106 (including firewall server 402 and web server 404), and firewall 110. In the example of FIG. 9, user device 104-1 may have a network address of 1.2.3.7 and application server 108-1 may have a network address of 1.2.3.6.

Process 800 may begin when a policy server receives a user request to authenticate a user device (block 802). For example, user device 104-1 may be authenticated with policy server 106 for accessing application servers 108 protected by firewall 110. As shown in FIG. 9, signals 902 may pass between user device 104-1 and policy server 106 for authentication. Policy server 106 may authenticate user device 104-1 (and may establish a session with user device 104-1) using any number of authentication protocols, including, for example, the Transport Layer Security (TLS) protocol, the Secure Sockets Layer (SSL) protocol, etc. In one embodiment, a user of device 104-1 may be required to type (using, e.g., input device 230) a user name, password, and/or enter a pass code from a security fob or mobile phone. In one embodiment, user device 104-1 and policy server 106 may exchange secret keys. Policy server 106 may create record 722 in permission table 700 indicating that the user device with the network address 1.2.3.7 (e.g., network device 104-1) may have permission to access the resources at network address 1.2.3.6 (e.g., application server 108-1) using a destination port of 80 and a source port of 2323.

A request for a server resource may be received (block 804). As shown in FIG. 9, signal 904 may pass from user device 104-1 (e.g., using browser 264) to firewall 110 requesting a resource from application server 108-1. Signal 904 may include a TCP (Transmission Control Packet) packet to establish a connection to application server 108-1. Signal 904 may include a packet with a destination address of 1.2.3.6 (e.g., network address of application server 108-1) and a source address of 1.2.3.7 (e.g., network address of user device 104-1). Firewall 110, however, may not have provisioned a rule for user device 104-1 to pass messages to application server 108-1. For example, rule table 500 may be in the state as shown in FIG. 5A without any rule for a packet with a destination address of 1.2.3.6 and a source address of 1.2.3.7. As such, firewall 110 may drop the packet or not let it pass through firewall 110 to its intended destination, e.g., application server 108-1. In one embodiment, firewall 110 may store the packet for later processing.

An indication of no provision for a resource request in the firewall may be received (block 806). Because firewall 110 may not have provisioned a rule for user device 104-1 to access resources in application server 108-1, firewall 110 may send a message 906 to firewall server 402 indicating that data, e.g., a packet, has been dropped. Message 906 may include the source address, destination address, source port, destination port, etc., of the dropped packet. In the current example, message 906 may indicate that a packet from network address 1.2.3.7 (user device 104-1) to network address 1.2.3.6 (application server 108-1) has been dropped. Armed with the information received from firewall 110, firewall server 402 may access privilege table 700 to determine whether firewall 110 should or should not provision access for user device 104-1 and may take appropriate action as described below with respect to block 810.

The request for the server resource may be redirected to a web server in a policy server (block 808). In addition to sending a message to firewall server 402 regarding the dropped packet, firewall 110 may redirect user device 104-1 (e.g., redirect browser 264) to web server 404 in policy server 106. As shown in FIG. 9, signal 908 may be a redirection signal, which may be passed by user device 104-1 (e.g., by browser 264) to web server 404 in policy server 106 as signal 910. In one embodiment, user device 104-1 may not recognize that redirection signal 908 is from firewall 110 and not application server 108-1. As such, firewall 110 may be masquerading as application server 108-1. Redirection signal 908 may include query information (that may pass, in turn, to web server 404 through signal 910) that may enable web server 404 to query firewall server 402 as to whether firewall 110 has provisioned a rule allowing user device 104-1 access to application server 108-1.

A request for the provisioning of a rule to allow the user device to access the application server may be sent (block 810). After consulting privilege table 700, firewall server 402 may determine that resource request 904 from user device 104-1 should have been allowed to pass through firewall 110 to application server 108-1. Firewall server 402 may send a message 912 to firewall 110 instructing firewall 110 to provision a rule in rule table 500 to allow messages from user device 104-1 to application server 108-1 to pass through firewall 110. Message 912 may include the source network address (1.2.3.7), the destination network address (1.2.3.6), the source port (2323), and the destination protocol (23) to afford user device 104-1 to access application server 108-1. In another embodiment, message 912 may include a confirmation that firewall 110 may provision access in response to signal 906 to firewall server 402. In addition to sending message 912, firewall server 402 may add a rule to rule table 600' stored in its memory 260. For example, firewall server 402 may add rule 622 as shown in FIG. 6B. Rule 622 may be for packets to destination address 1.2.3.6, from source address 1.2.3.7, with a destination port of 80, and a source port of 2323 to pass through firewall 110. As indicated in acknowledgment field 610, however, firewall 110 has yet to acknowledge that it actually added the rule to its rule table.

Acknowledgment of provisioning of the rule in the firewall may be received (block 812). Firewall 110 may receive message 912 from firewall server 402 to provision a rule in rule table 500 such that user device 104-1 may access application server 108-1. Firewall 110 may send a message 916 to firewall server 402 to acknowledge that the rule provisioning access for user device 104-1 has been added to rule table 500. Firewall server 402 may receive message 916 acknowledging that the rule provisioning access for user device 104-1 to application server 108-1. After receiving signal 916, firewall server 402 may update acknowledgment field 610 of rule 622 to indicate that firewall server 402 has received acknowledgment from firewall 110 that rule 622 has been added (e.g., rule 622', field 610 is changed from "N" to "Y" as shown in rule table 600").

Whether access has been provisioned in the firewall may be determined (block 814). After firewall server 402 requests provisioning of the rule in firewall 110 in block 810, it may take time before firewall 110 actually provisions access. In one embodiment, user device 104-1 may wait until access is actually provisioned in firewall 110 before reattempting to access application server 108-1. In this embodiment, web server 404 may communicate over bus 406 (using signals 914 and/or 918) to firewall server 402 to determine whether firewall server 402 has received acknowledgment from firewall 110 that a rule has been provisioned in firewall 110 for user device 104-1. If firewall server 402 has received acknowledgment from firewall 110, then firewall server 402 may indicate so to web server 404. As shown in FIG. 9, at the time signals 914 were passed between web server 404 and firewall server 402, firewall server 402 had yet to receive acknowledgment from firewall 110 that access was provisioned for user device 104-1. At the time signals 916 were passed between web server 404 and firewall server 402, however, firewall server 402 had received acknowledgment message 916 from firewall 110 that access was provisioned for user device 104-1.

The user device may be redirected to the requested resource (block 816). For example, after web server 404 receives a message from firewall server 402 that firewall 110 has provisioned assess for user device 104-1, web server 404 may redirect (using signal 920) user device 104-1 (e.g., browser 264) back to application server 108-1. In this embodiment, therefore, redirection signal 920 occurred after signals 918 were exchanged between web server 404 and firewall server 402. As shown in FIG. 9, the redirect message (signal 920) may include information regarding the requested resources of the original request (e.g., signal 904). Through this redirection, browser 264 may re-request the resources of signal 904 in signal 922.

In one embodiment, web server 404 may choose not to wait for acknowledgment of the provision of the rule in firewall 110 before redirecting (signal 920) to user device 104-1 to application server 108-1. Alternatively, user device 104-1 may re-request the resource (signal 404) again without waiting for redirection signal 920.

The requested resources may be delivered or otherwise made available to the requesting user device (block 818). Because signal 922 may pass through firewall 110, application server 108-1 may provide the resources requested in signal 922 (which may be the same as the resources requested in signal 904). As shown in FIG. 9, the originally requested resources may be delivered in signal 924.

CONCLUSION

Embodiments described herein may use the Internet-protocol (IP), asynchronous transfer mode (ATM) protocol, or any other type of network protocol. As such, embodiments described herein may use IP addresses, ATM addresses, or any other type of network addresses. Although some embodiments may be described in terms of packets, other embodiments may use any form of data (packet or non-packet). As used herein, the term "data unit" may include a packet, cell, or datagram; a fragment of a packet, cell, or datagram; a group of packets, cells, or datagrams; or other types of data.

It will be apparent that aspects, as described above, may be implemented in many different forms of software, firmware, and hardware in the embodiments illustrated in the figures. The actual software code or specialized control hardware used to implement these aspects is not limiting of the present invention. Thus, the operation and behavior of the aspects were described without reference to the specific software code-it being understood that software or control hardware could be designed to implement the aspects based on the description herein.

Further, although the processes described above, including process 800, may indicate a certain order of blocks, the blocks in these figures may be configured in any order.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a firewall device, one or more rules for provisioning access to a resource;
    receiving, by the firewall device, a data unit from a device;
    determining, by the firewall device and based on the one or more rules, not to forward the data unit to a destination address associated with the resource;
    redirecting, by the firewall device, the device to a server associated with provisioning access to the resource,
        the firewall device redirecting the device to the server based on determining not to forward the data unit to the destination address;
    receiving, by the firewall device and from the server, a rule for allowing the firewall device to provision access to the resource for the device,
        the rule being received by the firewall device after the server determines that the firewall device should provision access to the resource for the device;
    provisioning, by the firewall device, access to the resource for the device based on the rule;
    providing, by the firewall device and to the server, information indicating that the access to the resource for the device has been provisioned,
        the information being used to permit the server to redirect the device to the destination address via the firewall device; and
    allowing, by the firewall device, the device to access the resource, based on provisioning the access to the resource, after the device is redirected to the destination address.

2. The method of claim 1, further comprising:
    dropping the data unit based on determining not to forward the data unit to the destination address.

3. The method of claim 1, where the receiving the rule includes:
    receiving information identifying one or more of:
        a source address associated with the device,
        the destination address,
        a source port associated with receiving data units from the device, or
        a protocol associated with the device accessing the resource.

4. The method of claim 1, where the data unit comprises a request for the resource, and where the allowing includes:
  receiving another request for the resource from the device,
    the other request being received based on the device being redirected to the destination address, and
  allowing the device to access the resource based on receiving the other request.

5. The method of claim 1, where the destination address comprises an Internet protocol (IP) address.

6. The method of claim 1, where the determining not to forward the data unit includes:
  determining not to forward the data unit based on the destination address and a network address associated with the device.

7. The method of claim 1, further comprising:
  storing the data unit based on determining not to forward the data unit to the destination address.

8. A firewall device comprising:
  a processor to:
    obtain one or more rules for provisioning access to a resource;
    receive a request for a resource from a device;
    determine, based on the one or more rules, not to forward the request to a destination address associated with the resource;
    redirect the device to a network device associated with provisioning access to the resource based on determining not to forward the request to the destination address;
    receive, from the network device, a rule for allowing the firewall device to provision access to the resource for the device,
      the rule being received by the firewall device after the network device determines that the device is authorized to access the resource;
    provision access to the resource for the device based on the rule;
    provide, to the network device, information indicating that the access to the resource for the device has been provisioned,
      the device being redirected to the destination address, via the firewall device, based on the information; and
    allow the device to access the resource, based on provisioning the access to the resource, when the device is redirected to the destination address.

9. The firewall device of claim 8, where, when determining not to forward the request, the processor is to:
  determine not to forward the request based on a source port and a destination port associated with the request.

10. The firewall device of claim 8, where, when receiving the request, the processor is to:
  receive a transmission control packet (TCP) packet for establishing a connection to an application server associated with the resource.

11. The firewall device of claim 8, where the request is received after an authentication of the device has been performed.

12. The firewall device of claim 8, where, when determining not to forward the request, the processor is to:
  determine that the one or more rules do not include a rule associated with permitting messages from the device to be transmitted to an application server associated with the resource.

13. The firewall device of claim 8, where the request comprises a data unit, and
  where the processor is further to:
    transmit a message to the network device based on determining not to forward the request,
      where the message indicates that the data unit has been dropped.

14. The firewall device of claim 13, where the message includes information identifying the destination address and a source address associated with the data unit.

15. A non-transitory computer-readable medium storing instructions, the instructions comprising:
  one or more instructions that, when executed by a processor of a first network device, cause the processor to:
    receive a data unit from a user device;
    determine, based on one or more rules for provisioning access to a resource, not to forward the data unit to a destination address associated with the resource;
    redirect the user device to a second network device associated with provisioning access to the resource based on determining not to forward the data unit to the destination address;
    receive, from the second network device, a rule for allowing access to the resource to be provisioned for the user device,
      the rule being received after the second network device determines that the access to the resource should be provisioned for the user device;
    provision access to the resource for the user device based on the rule;
    provide, to the second network device, information indicating that the access to the resource for the user device has been provisioned,
      the user device being redirected to the destination address, via the first network device, based on the information; and
    permit the user device to access the resource, based on provisioning the access to the resource, after the user device is redirected to the destination address.

16. The non-transitory computer-readable medium of claim 15, where the instructions further comprise:
  one or more instructions that, when executed by the processor, cause the processor to:
    drop the data unit based on determining not to forward the data unit to the destination address.

17. The non-transitory computer-readable medium of claim 16, where the instructions further comprise:
  one or more instructions that, when executed by the processor, cause the processor to:
    transmit a message to the second network device indicating that the data unit has been dropped.

18. The non-transitory computer-readable medium of claim 15, where the one or more instructions to redirect the user device include:
  one or more instructions that, when executed by the processor, cause the processor to:
    transmit query information to the user device,
      the query information enabling the user device to query the second network device as to whether the first network device has provisioned a rule allowing the user device to access an application server associated with the resource.

19. The non-transitory computer-readable medium of claim 15, where the one or more instructions to receive the rule include:
  one or more instructions that, when executed by the processor, cause the processor to:
    receive, from the second network device, information identifying one or more of:
      a source address associated with the user device, the destination address,
a source port associated with receiving data units from the user device, or
a protocol associated with the user device accessing the resource.

20. The non-transitory computer-readable medium of claim 15, where the data unit comprises a request for the resource, and
where the one or more instructions to permit the user device to access the resource include:
one or more instructions that, when executed by the processor, cause the processor to:
receive another request for the resource from the user device,
the other request being received based on the user device being redirected to the destination address, and
permit the user device to access the resource based on receiving the other request.

\* \* \* \* \*